US006301661B1

(12) United States Patent
Shambroom

(10) Patent No.: US 6,301,661 B1
(45) Date of Patent: Oct. 9, 2001

(54) ENHANCED SECURITY FOR APPLICATIONS EMPLOYING DOWNLOADABLE EXECUTABLE CONTENT

(75) Inventor: W. David Shambroom, Arlington, MA (US)

(73) Assignee: Verizon Labortories Inc., Waltham, MA (US)

( * ) Notice: Subject to any disclaimer, the term of this patent is extended or adjusted under 35 U.S.C. 154(b) by 0 days.

(21) Appl. No.: 09/336,557

(22) Filed: Jun. 19, 1999

Related U.S. Application Data

(63) Continuation-in-part of application No. 08/799,402, filed on Feb. 12, 1997, now Pat. No. 5,923,756.

(51) Int. Cl.[7] ....................................................... H04L 9/00

(52) U.S. Cl. .............................................................. 713/168

(58) Field of Search .................................... 713/153, 155, 713/156, 162, 168, 170, 200, 201, 202, 184

(56) References Cited

U.S. PATENT DOCUMENTS

| 5,313,521 | 5/1994 | Torii et al. ............................... 380/25 |
| 5,349,643 | 9/1994 | Cox et al. ................................ 380/25 |
| 5,416,842 | 5/1995 | Aziz ......................................... 380/25 |
| 5,511,122 | 4/1996 | Atkinson ................................. 380/25 |
| 5,590,199 | 12/1996 | Krajewski, Jr. et al. ............... 380/25 |
| 5,604,803 | 2/1997 | Aziz ......................................... 380/25 |
| 5,764,687 | 6/1998 | Kells et al. .............................. 380/23 |
| 5,768,504 | 6/1998 | Kells et al. .............................. 380/25 |
| 5,862,325 | 1/1999 | Reed et al. ....................... 395/200.31 |
| 5,875,296 | 2/1999 | Shi et al. .......................... 395/188.01 |
| 5,884,312 | 3/1999 | Dustan et al. .......................... 707/10 |
| 6,092,194 | * 7/2000 | Touboul et al. ....................... 713/200 |
| 6,154,844 | * 11/2000 | Touboul et al. ....................... 713/201 |

OTHER PUBLICATIONS

Ladd et al, Using HTML 3.2, JAVA 1.1 and CGI, Nov. 96, Que Corporation, Chapter 46, pp. 1047–1063.*
Gradient Technologies, Inc., Web Integration Strategies: Believe It or Not–Gradient Technologies' WebCrusader, Apr. 1996, pp. 1–12.
Gradient Technologies, Inc., Developing Secure Web–based Java Applications, The Integration of Web Crusader and Net Dynamics, May 1997, pp. 1–16.
Gradient Technologies, Inc., Encryption Security In the Enterprise, Public Key/Secret Key, Jan. 1997, pp. 1–20.
InformationWeek, Spinning a Secure Web, Aug. 12, 1996 (4 pages).

(List continued on next page.)

Primary Examiner—Tod Swann
Assistant Examiner—Matthew Smithers
(74) Attorney, Agent, or Firm—Leonard Charles Suchyta

(57) ABSTRACT

Method and computer network for enhanced security for applications using downloadable executable content is described. More particularly, a client is operatively coupled to an authentication server and a remote host through a gateway. In an initial login session, authentication information is provided from the client to the gateway for obtaining client-authenticating credentials from the authentication server. These client-authenticating credentials may be encoded to be in a form of a data string and provided to the client, for example as the value of an HTTP cookie. The encoded data string may be provided to the client as one or more parameter values. These parameter values may be employed along with requested downloadable executable content, such as one or more Java classes, for running on the client. The Java classes may communicate the parameter values to an execution server of the gateway for decoding the encoded data string in order to extract the client-authenticating credentials therefrom. These client-authenticating credentials may then be used to obtain from the authentication server one or more keys and/or other authenticating credentials to establish a remote login session or other interactive communication with the remote host.

55 Claims, 4 Drawing Sheets

OTHER PUBLICATIONS

Gradient Technologies, Inc., NetCrusader Product Data Sheet, NetCrusader's Distributed Services Product Line, Mar. 1997 (4 pages).

Gradient Technologies, Inc., NetCrusader Product Family Overview, Mar. 1997 (4 pages).

Gradient Technologies, Inc., NetCrusader Product Data Sheet, NetCrusader Commander, Mar. 1997 (4 pages).

Gradient Technologies, Inc., WebCrusader Product Data Sheet, WebCrusader Product Line, Mar. 1997 (4 pages).

Gradient Technologies, Inc., Web–based applications Make the Grade at Penn State University, 1996 (2 pages).

MIT, Kerberos V5 Installation Guide (Release beta 7), Sep. 11, 1996.

MIT, Kerberos V5 System Administrator's Guide (Release beta 7), Sep. 10, 1996.

MIT, Kerberos V5 UNIX User's Guide (Release beta 7), Sep. 10, 1996.

MIT, Kerberos V5 Application Programming Library, Sep. 10, 1996.

MIT, Kerberos V5 Data Encryption Standard Library draft, p. 1.

MIT, Kerberos V5 Implementers's Guide, Sep. 10, 1996.

Jaspan, Barry, Kerberos Administration System KADM5 API Functional Specifications, Sep. 10, 1996.

Jaspan, Barry, KADM5 Library and Server Implementation Design, Sep. 10, 1996.

Kamens, Jonathan I., KADM5 Admin. API Unit Test Description, Sep. 10, 1996.

Kamens, Jonathan I., Open V*Secure Admin. Database API Unit Test Description*, Sep. 10, 1996.

MIT, Kerberos V5 Installation Guide (Release 1.0 Dec. 18, 1996.

MIT, Kerberos V5 System Administrator's Guide (Release 1.0) Nov. 27, 1996.

MIT, Kerberos V5 UNIX User's Guide (Release 1.0) Dec. 18, 1996.

MIT, Upgrading to Kerberos V5 from Kerberos V4 (Release 1.0), Dec. 18, 1996.

Freier, Alan O., et al., The SSL Protocol, Version 3.0, Mar. 4, 1996.

Kohl, J. and Neuman, C., the Kerberos Network Authentication Service (V5), Sep., 1993.

Schneier, Bruce, Applied Cryptography, $2^{nd}$ ed., (1996), pp. 566–572.

Steiner, Jennifer G., et al., Kerberos: An Authentication Service for Open Network Systems, Mar. 30, 1988.

Kohn, John T., et al., The Evolution of the Kerberos Authentication Service, Spring 1991, EurOpen Conference, Tromso, Norway.

* cited by examiner

ENHANCED SECURITY FOR APPLICATIONS EMPLOYING DOWNLOADABLE EXECUTABLE CONTENT

CROSS-REFERENCE TO RELATED APPLICATIONS

This application for patent is a continuation-in-part of copending U.S. patent application Ser. No. 08/799,402, filed Feb. 12, 1997 now U.S. Pat. No. 5,923,756, having the same inventor and assignee as herein named, which is incorporated by reference as though fully set forth herein.

FIELD OF THE INVENTION

The present invention generally relates to information technology, and more particularly relates to enhancing security for applications employing downloadable executable content over a computer network.

BACKGROUND OF THE INVENTION

In basic terms, people often wish to communicate with one another with a degree of privacy or confidentiality. Accordingly, in a computer network environment, a message may be enciphered before being transmitted over an insecure network, such as the Internet. The enciphered message has thus been converted from "plaintext" to "ciphertext." The intended receiver of the message may then decipher the "ciphertext" message to obtain a "plaintext" version thereof. The terms encipher and decipher are used instead of the terms encrypt and decrypt in accordance with ISO 7498-2.

In the computer network environment, confidentiality is one goal among others. Other goals include authentication, authorization, data integrity, and nonrepudiation. By authentication, it is meant that it should be possible for the receiver of information to ascertain its origin to mitigate against the possibility of an interloper masquerading as the sender. By authorization, it is meant that is should be possible to ascertain whether a user is permitted to perform an operation. By data integrity, it is meant that it should be possible for the receiver of data to verify that it has not been modified in transit to mitigate against the possibility of an intruder introducing false data. By nonrepudiation, it is meant that a sender should not be able to falsely deny origination of a message sent by them. Thus, enhancing security of a computer network may include enhancing one or more of these goals of confidentiality, authentication, authorization, data integrity, and nonrepudiation.

As mentioned above, plaintext is converted into ciphertext to enhance security. This transformation conventionally uses a cryptographic algorithm or cipher. Moreover, a cipher is conventionally used to convert the ciphertext back to plaintext. For either type of conversion, a cipher is conventionally a mathematical function for enciphering or deciphering a message.

Modern cryptography employs one or more "keys." A "key" in a cryptographic sense is employed to "lock" (encipher) or "unlock" (decipher) a message. However, a "key" in cryptographic sense is conventionally one or more numbers. In a security system premised on secrecy of keys and not secrecy of algorithms using the keys, algorithms may be widely published without significantly adversely harming security.

Security protocols have been developed using one or more ciphers to achieve one or more of the above-mentioned goals of confidentiality, authentication, authorization, data integrity, and nonrepudiation. Two examples of such protocols are Kerberos and Secure Sockets Layer (SSL). Each of these protocols are described in more detail in allowed co-pending U.S. patent application, application Ser. No. 08/799,402, filed Feb. 12, 1997, entitled "Method for Providing Secure Remote Command Execution Over an Insecure Computer Network" to the named inventor herein (hereinafter referred to as "Shambroom-I").

In Shambroom-I, an approach for increasing security of data transmission between a client and a server is described. However, Shambroom-I does not provide enhance security with a "mobile code" technology, including without limitation Java (Java is a trademark of Sun Microsystems, Inc.). Java is one example of a platform-independent object-oriented programming language used for writing "applets" that are downloadable over a network (for example, the Internet) by a client and executable on the client's machine. "Applets" are applications programs that downloadable and run in a client's web browser or applet viewer. In other words, Shambroom-I does not provide enhanced security for applications employing downloadable executable content.

Accordingly, it would be desirable to provide enhanced security for applications employing downloadable executable content.

SUMMARY OF THE INVENTION

The present invention provides method and computer network for enhanced security for an application using downloadable executable content. Enciphered communication is established between a client and a gateway, and login information is provided from the client to the gateway. Communication is established between the gateway and an authentication server. Client-identifying information associated with the login information is provided to the authentication server, and in return client-authenticating information is obtained from the authentication server. The client-authenticating information is encoded and provided to the client. The encoded client-authenticating information may subsequently be provided to the gateway, which information may be accompanied by remote login information. This encoded client-authenticating information and remote login information may be used to dynamically create one or more parameter values. The one or more parameter values, as well as downloadable executable content, are provided from the gateway to the client. The application may execute the downloadable executable content on the client using the one or more parameter values.

After which, the remote login information and the one or more parameter values may be provided from the client to an execution server of the gateway. The parameter values are decoded to obtain the encoded client-authenticating information. The encoded client-authenticating information is then decoded. At least a portion of the decoded client-authenticating information may be provided to the authentication server for receipt of one or more keys and/or other authenticating credentials for communication with a remote host. The one or more keys and/or other authenticating credentials and at least a portion of the remote login information may be used to establish communication with the remote host to provide a bi-directional data path between the remote login host and the client through the gateway. The bi-directional data path may comprise enciphered communication over an insecure network between the client and the gateway and between the gateway and the remote host.

Accordingly, it should be appreciated that one or more security protocols may be employed in accordance with the present invention to establish enciphered communication over the insecure network portions. This enciphered communication, along with the above-mentioned method and computer network may be used for enhanced security for a subsequent login session, including without limitation a remote login session. Advantageously, method and computer network in accordance with the present invention may be employed for remote maintenance of a computer or computer network, electronic commerce ("e-commerce"), and the like where enhanced security is desirable. Additionally, it should be appreciated that such method and computer network allows for a security protocol, which may not be supported by a particular client, to be supported owing to the downloadable executable content.

These and other features, advantages, objects and embodiments of the present invention will become more apparent from reading the following Detailed Description of the Preferred Embodiments or by practicing the present invention.

DESCRIPTION OF THE DRAWINGS

The features of the present invention, as well as objects and advantages, will best be understood by reference to the appended claims, detailed description and accompanying drawings where:

In the drawings, same reference numbers refer to like components throughout the several figures.

DETAILED DESCRIPTION OF THE PREFERRED EMBODIMENTS

In the following detailed description, reference is made to the accompanying drawings which form a part of this detailed description, and in which, shown by way of illustrative example, specific embodiments are described. These embodiments are described in sufficient detail to enable those of skill in the art to practice the present invention. However, it is to be understood that other embodiments of the present invention not described herein in detail may be utilized. Therefore, the following detailed description is not to be taken in a limiting sense.

Figure 1:
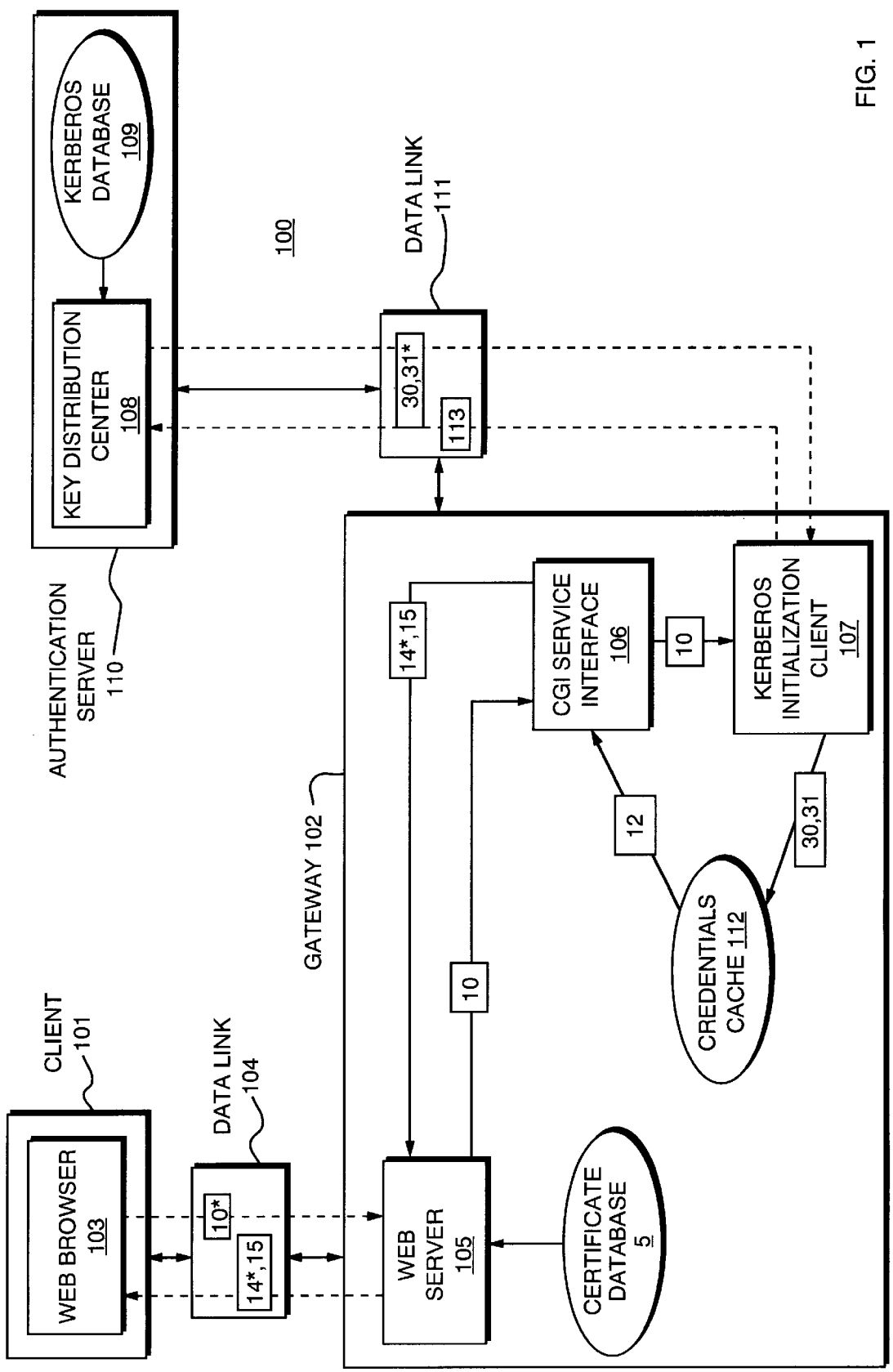
FIGS. 1 through 4 are block diagrams of exemplary portions of embodiments of a computer network in accordance with the present invention.

Referring to FIG. 1, there is illustratively shown a block diagram of an exemplary portion of an embodiment of a computer network 100 in accordance with the present invention. By computer network, it is meant one or more computers operatively coupled to one or more other computers via one or more data links. Computer network 100 comprises client 101 operatively coupled via data link 104 for communicating with gateway 102, and comprises gateway 102 operatively coupled via data link 111 for communicating with authentication server 110. Data links 104 and 111, as well as data link 313 (illustratively shown in FIG. 3), may comprise a portion of an insecure network, including without limitation a non-private network, a virtual private network, and the like. An example of an insecure network is the Internet. Accordingly, such data links may comprise any of a number connection types, including without limitation cellular, satellite, phone line, cable TV line, local area network (LAN), wide area network (WAN), and the like. To more clearly describe the present invention, an Internet embodiment for computer network 100 is described herein below in this Detailed Description. However, it should be appreciated that computer network 100 may comprise any of a number of data communication protocols other than Transmission Control Protocol/Internet Protocol (TCP/IP).

Client 101 may be a client workstation, such as a computer. By way of example and not limitation, client 101 may comprise a computer running an operating system such as UNIX (including without limitation variants of UNIX; UNIX is a trademark of AT&T), WindowsNT (WindowsNT is a trademark of Microsoft Corporation), Windows98 or Windows CE (Windows is a trademark of Microsoft Corporation), among others. Client 101 includes at least one browser 103 (hereinafter "web browser 103"), which by way of example and not limitation may comprise browser software such as Netscape Navigator (Netscape Navigator is a trademark of Netscape Communication Corp.), Microsoft Internet Explorer, among others for browsing the World Wide Web.

As mentioned above, client 101 is operatively coupled to gateway 102 via data link 104. Gateway 102, which by way of example and not limitation, may comprise one or more computers running an operating system such as UNIX, WindowsNT, among others. Gateway 102 includes server 105 (hereinafter "web server 105") which may comprise "web" server software such as Apache, Netscape Enterprise Server (Netscape Enterprise Server is a trademark of Netscape Communication Corp.), Microsoft Internet Information Server, among others for providing a web server to the World Wide Web. Notably, the term "server" as used herein may comprise a computer having an operating system. To more clearly describe the present invention, a UNIX embodiment for computer network 100 is described herein below in this Detailed Description. However, it should be appreciated that network computer 100 may comprise one or more operating systems.

Web browser 103 and web server 105 exchange information using a protocol stack, which may include a transport security layer like SSL or some other security protocol that uses one or more ciphers. Accordingly, web server 105 and web browser 103 may thus electrically communicate with one another in an enciphered state over data link 104. In an embodiment employing SSL, web server 105 obtains an X.509 from certificate database 5. At or near the end of initialization of this security protocol, web browser 103 provides in an enciphered state an inquiry to web server 105. The inquiry may be in the form of a Hypertext Transport Protocol (HTTP) request for Hypertext Markup Language (HTML) form requesting user identification information, conventionally username and password. Subsequent to this inquiry, initial login data 10, provided by a user of client 101, is enciphered (an asterisk is used in the several FIGS. to denote enciphering) and then sent from web browser 103 to web server 105. Web server 105 may now decipher initial login data 10 for further processing.

To more clearly describe the present invention, a Kerberos embodiment for computer network 100 is described herein below in this Detailed Description. Thus, initial login data 10 for this exemplary embodiment comprises a Kerberos user principal name and Kerberos user password. However, it should be appreciated that computer network 100 may comprise any of a number of security protocols, many of which may be found in "Applied Cryptography Second Edition: protocols, algorithms, and source code in C" by Bruce Schneier, published by John Wiley & Sons, Inc., New York, 1996 (ISBN 0-471-12845-7). Some other security protocols which may be used include without limitation DCE Security, SESAME, and the like.

Contemporaneously with receiving initial login data 10, web server 105 executes service interface process 106, which may be a Common Gateway Interface (CGI) service interface process ("CGI process") 106 as illustratively shown in FIG. 1 and the like. Though CGI process 106 is illustratively shown as a separate process from web server 105, it should be understood that alternatively process 106 may be embedded in web server 105, such as a "servlet."

Web server 105 provides CGI process 106 initial login data 10. CGI process 106 provides an interface for passing login data 10 to initialization client 107. In the exemplary embodiment illustratively shown in FIG. 1, initialization client 107 is a Kerberos initialization client.

Kerberos initialization client 107 sends a request for a ticket granting ticket (TGT), namely TGT request 113, to Key Distribution Center (KDC) 108 of authentication server 110. TGT request 113 may comprise at least a portion of login data 10, such as a Kerberos user principal name. KDC 108 creates KDC session key 31, extracts a Kerberos user principal key from database 109 using the above-mentioned Kerberos user principal name from TGT request 113 as a pointer, and creates TGT 30. In the exemplary embodiment illustratively shown in FIG. 1, database 109 is a Kerberos database. TGT 30 and KDC session key 31 are collectively referred to herein as "credentials" 12; however, it should be appreciated that other security protocols may be used in accordance with the present invention and likewise other client-authenticating information may be used. KDC 108 enciphers KDC session key 31 with the above-identified user principal key, and then provides TGT 30 and enciphered KDC session key 31 to Kerberos initialization client 107.

Kerberos initialization client 107, using the Kerberos user principal password, generates a user principal key and uses it to decipher KDC session key 31. Kerberos initialization client 107 may store credentials 12 on disk or in some form of system memory, as illustratively shown in FIG. 1 as credentials cache 112. After storing credentials 12, Kerberos initialization client 107 may exit.

Additional details with respect to the above-description of FIG. 1 may be found in Shambroom-I With continuing reference to FIG. 1, CGI process 106 obtains credentials 12 from credentials cache 112. CGI process 106 encodes credentials 12 and provides them to web server 105. By way of example and not limitation, credentials 12 may be American Standard Code for Information Interchange (ASCII) encoded and Uniform Resource Locator (URL) encoded. After encoding, credentials 12 are in a character data string form. Such a character data string may be used as an HTTP "cookie" 14. By "cookie", it is meant a piece of information a server may store on a client for later retrieval. This data character string represents the value of an HTTP "cookie." CGI process 106 may now cause credentials cache 112 to be erased (e.g., written over one or more times) for security, and CGI process 106 may then exit.

HTTP "cookie" 14 and HTML command form 15 are enciphered by web server 105, and then HTTP cookie 14 and HTML command form 15 are sent to client 101, or more particularly web browser 103. Notably, HTTP is stateless, so HTTP cookie 14 may be used to preserve information regarding a state after one or more subsequent HTTP sessions or invocations. Accordingly, HTTP cookie 14 and HTML command form 15 may be used by web browser 103 to initiate one or more subsequent remote interactive logins, as is explained in more detail elsewhere herein. For purposes of security, HTTP cookie 14 is not stored on a disk medium or any other form of non-volatile storage media.

Download of Executable Content

Figure 2:
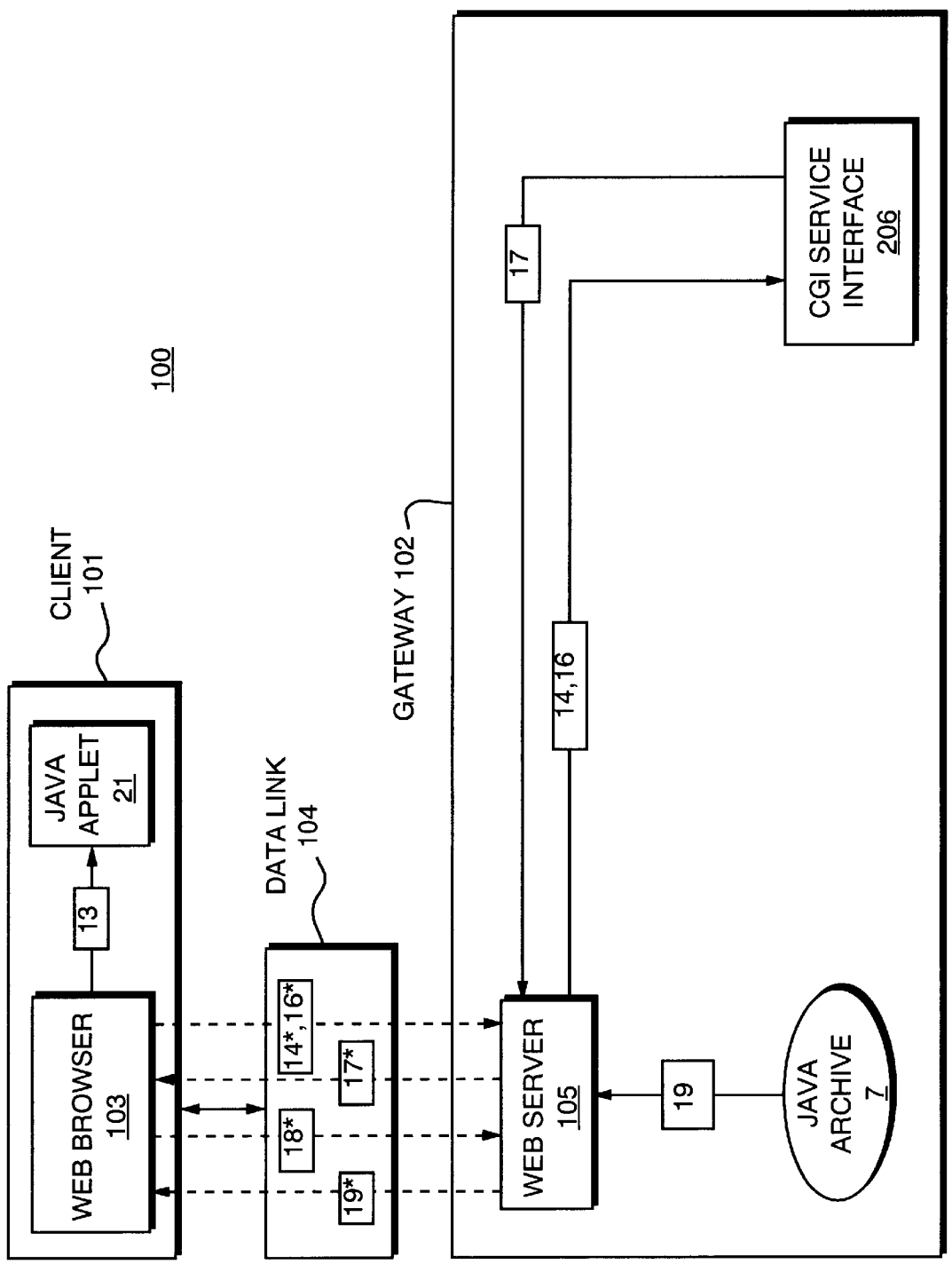

Referring to FIG. 2, there is illustratively shown a block diagram of an exemplary portion of an embodiment of computer network 100 in accordance with the present invention. Using HTML form 15 (illustratively shown in FIG. 1), a user may input remote interactive login data 16. Client 101, or more particularly web browser 103, provides HTTP cookie 14 and remote interactive login data 16 to web server 105 over data link 104. As previously mentioned, web browser 103 and web server 105 have established a security protocol involving enciphering and deciphering.

Remote interactive login data 16 comprises at least one remote host name and at least one remote user name. More specifically, remote interactive login data 16 may comprise one or more pairs of remote host and user names, or multiple remote host names and a single remote user name. A remote user name may be the same as or different from a portion of an above-mentioned Kerberos user principle name.

To more clearly describe the present invention, a Java embodiment is described herein below in this Detailed Description. However, it should be appreciated that other downloadable executable content may be used.

Web server 105 executes CGI process 206, and then provides HTTP cookie 14 and remote interactive login data 16 to CGI process 206. Though CGI process 206 is illustratively shown as a separate process from web server 105, it should be understood that alternatively process 206 may be embedded in web server 105.

CGI process 206 dynamically creates an HTML document 17, where HTTP cookie 14 and remote interactive login data 16 may be used to set one or more values of applet parameters. By dynamically creates, it is meant that at least one newly determined parameter value is provided for each remote interactive login.

Web server 105 sends HTML document 17 to web browser 103, and in response thereto web browser 103 sends Java class download request 18 to web server 105. In response to Java class download request 18, web server 105 retrieves one or more "Java classes" 19 from Java archive 7. By "Java classes," it is meant compiled Java source code programs. Information in HTML document 17 may be used as a pointer to one or more "Java classes" 19 for accessing and downloading thereof.

Web server 105 sends one or more retrieved Java classes 19 to web browser 103. In response thereto, web browser 103 starts a "Java virtual machine," which loads retrieved Java classes 19 and associated parameter values. By "Java virtual machine," it is meant a computer emulation that may be run on a computer. Java applet 21 identified in HTML document 17 is executed using Java classes 19. Java applet 21 uses parameter values 13 from web browser 103, which were obtained from HTML document 17.

With continuing reference to FIG. 2 and renewed reference to FIG. 1, it should be appreciated that Java applet 21 contains parameter values 13 to enable another process to communicate with KDC 108, as is explained below in more detail. Accordingly, it will become more apparent from the Detailed Description below, that HTTP cookie 14 has provided information as to a prior state that may be used for one or more subsequent authenticated and enciphered sessions.

Remote Interactive Login Connection—Providing a Remote Interactive Login Client with a Restored TGT and KDC Session Key Owing to the above described download of Java applet 21, a remote interactive login connection with remote host 114 may be established, as is explained in more detail with reference to FIG. 3, where there is illustratively shown a block diagram of an exemplary portion of an embodiment of computer network 100 in accordance with the present invention. Java applet 21 may include a virtual terminal emulator, including without limitation VT320, among other well-known terminal emulations.

Java applet 21 and execution server 305 exchange information using a protocol stack, which may include SSL or some other security protocol. In an embodiment employing SSL, execution server 305 obtains an X.509 certificate from certificate database 6. At or near the end of initialization of this security protocol, execution server 305 changes communication with Java applet 21 from an non-enciphered state to an enciphered state and executes an interface, which may be "pseudo-terminal" interface 306. By "pseudo-terminal" interface, it is meant a terminal line-discipline front-end. Accordingly, pseudo-terminal interface 306 provides a terminal line-discipline front-end for subsequent processing.

Execution server 305 passes name 309 of shell service interface 310 as an input parameter to pseudo-terminal interface 306. Java applet 21 sends remote interactive login data 16 and encoded credentials 12, passed as dynamically created parameter values 13 (shown in FIG. 2), to execution server 305. Execution server 305 provides remote interactive login data 16 and encoded credentials 12 to pseudo-terminal interface 306.

Pseudo-terminal interface 306 executes shell service interface 310, and pseudo-terminal interface 306 passes remote interactive login data 16 and encoded credentials 12 to shell service interface 310. Shell service interface 310 decodes encoded credentials 12. Shell service 310 may then temporarily store decoded credentials 12 in credentials cache 112.

Shell service interface 310 executes remote interactive login client 311 providing remote interactive login data 16 to remote interactive login client 311 as one or more input parameters. Remote interactive login client 311 obtains TGT 30 and KDC session key 31 from decoded credentials 12 stored in credentials cache 112. Therefore, it should be understood that Java applet 21 has been used to restore TGT 30 and KDC session key 31.

Remote Interactive Login

Figure 3:
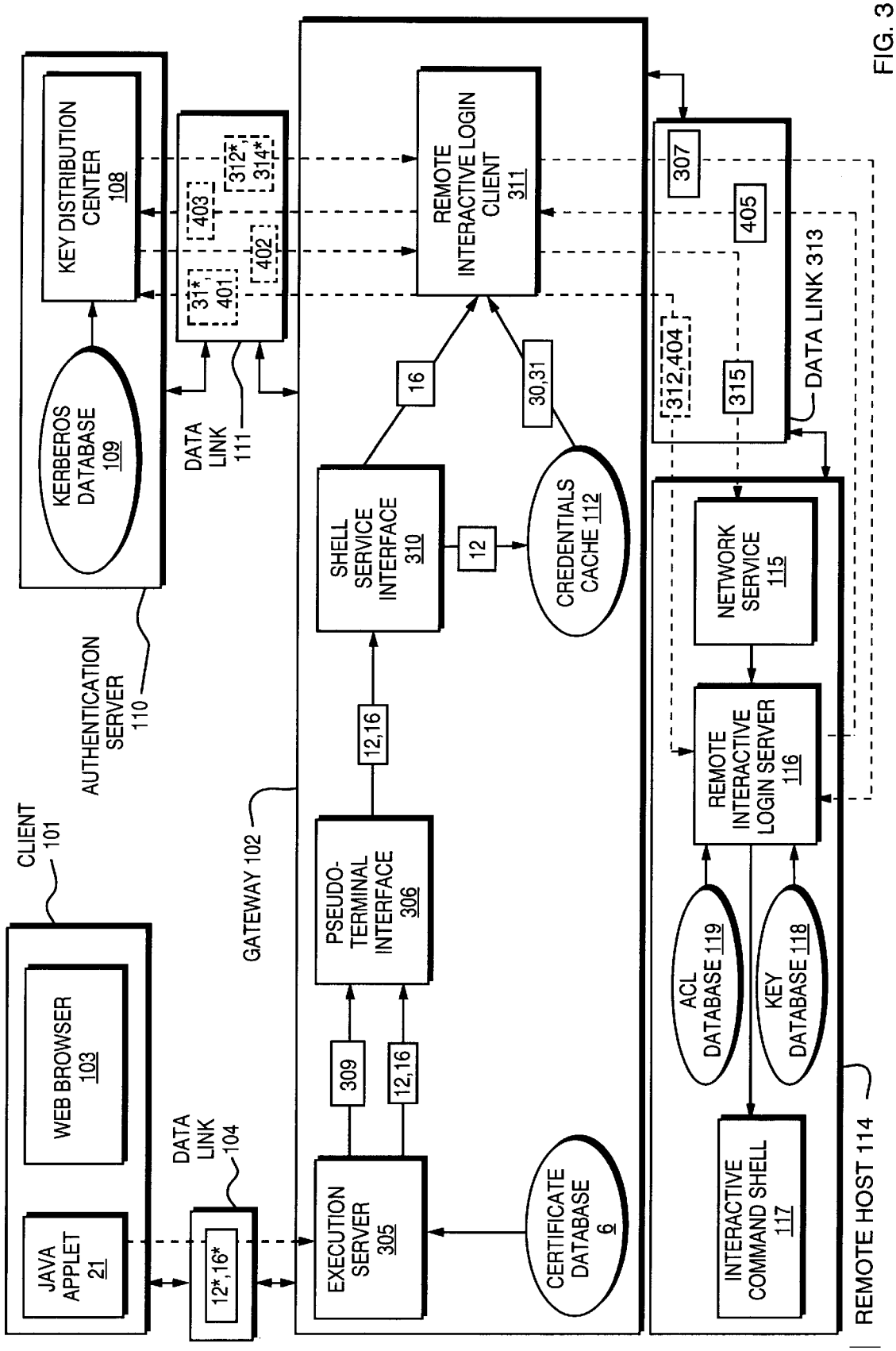

With continuing reference to FIG. 3, after obtaining TGT 30 from credentials cache 112, remote interactive login client 311 communicates with authentication server 110 in an enciphered state over data link 111 for purposes of validation. Remote interactive login client 311 sends TGT 31 and a Kerberos authenticator 401 to KDC 108. KDC 108 returns another Kerberos authenticator 402 to remote interactive login client 311. Again, it should be understood that although a Kerberos protocol uses authenticators and tickets for credentials, other protocols and likewise one or more other forms of credentials may be employed for authentication, enciphered communication, timestamping, or like purposes. After which, remote interactive login client 311 sends a server ticket request 403 to KDC 108, and then may receive a server ticket 312 and a remote host session key 314 from authentication server 110.

With continuing reference to FIG. 3, remote host 114 is operatively coupled via data link 313 for communication with gateway 102. After receiving server ticket 312 from authentication server 110, remote interactive login client 311 sends via data link 313 a connection request 315 to network "service" 115 of remote host 114. Network service 115 may be an "internet super-daemon."

In response to receiving connection request 315, network service 115 executes remote interactive login server 116. Remote interactive login client 311 sends server ticket 312 and a Kerberos authenticator 404 to remote interactive login server 116, and remote interactive login server 116 returns another Kerberos authenticator 405 to remote interactive login client 311. After which, remote interactive login server 116 and remote interactive login client 311 communicate in an enciphered state.

Then remote interactive login client 311 sends at least a portion of remote interactive login data 16 to remote interactive login server 116. In this exemplary embodiment, a Kerberos principal name from remote interactive login data 16 may be sent to remote interactive login server 116. In response to receiving a Kerberos principal name of remote interactive login data 16, remote interactive login server 116 checks access control list (ACL) database 119 for user authorization, which includes a list of Kerberos principal names. If access is granted, remote interactive login server 116 executes interactive command shell 117. As a UNIX embodiment is described herein, interactive command shell 117 is used. However, it should be understood that other forms of command interfaces for remote use may be employed.

Remote Interactive Login Session

Figure 4:
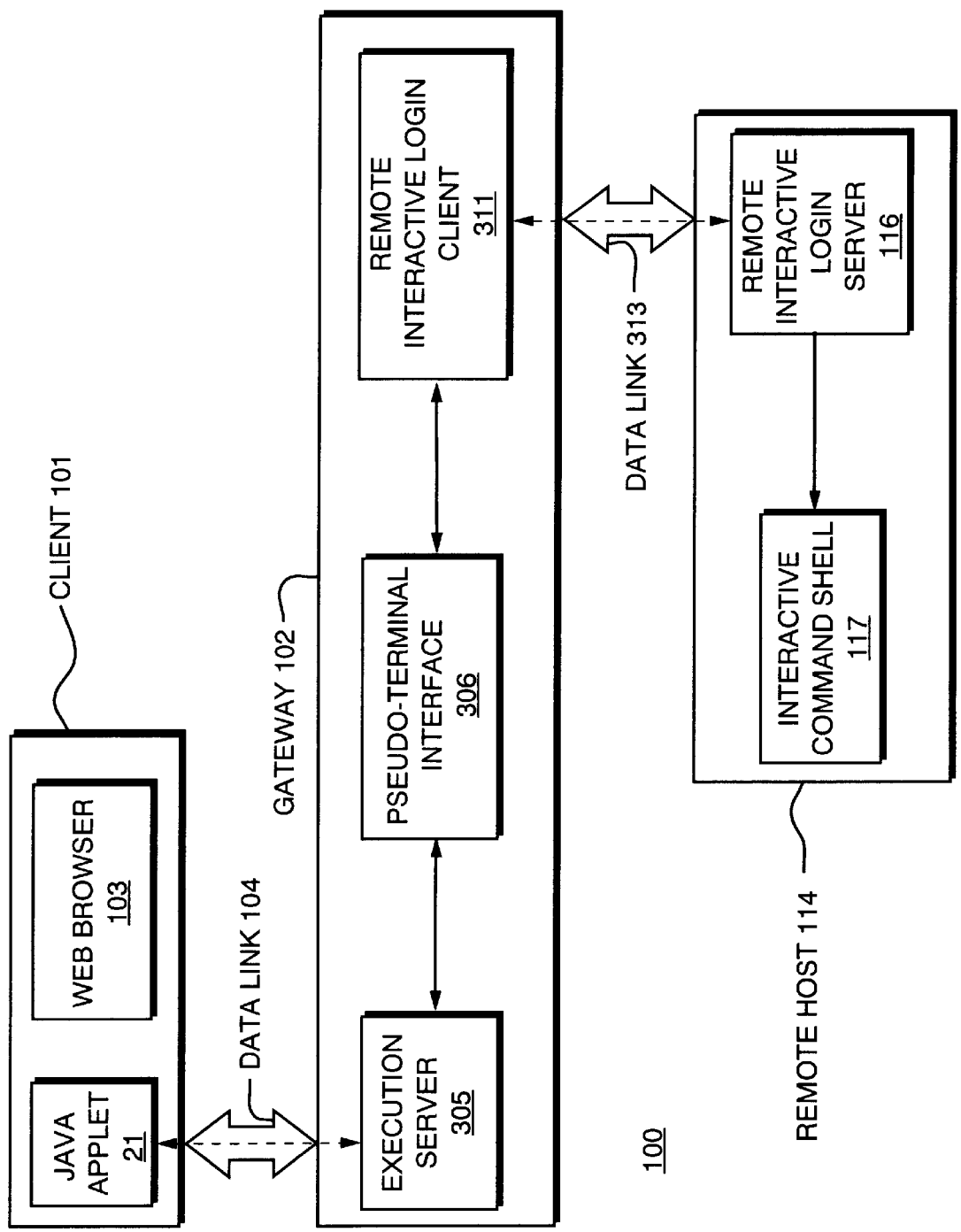

After execution of interactive command shell 117, a bi-directional data path from client 101 to remote host 114 through gateway 102 is established for an interactive login session, as is illustratively shown the block diagram of FIG. 4. Communication over data links 104 and 313 is enciphered. A user of client 101 may now exchange information with interactive command shell 117 over enciphered connections between Java applet 21 and execution sever 305 and between remote interactive login client 311 and remote interactive login server 116, as indicated by dashed lines.

With continuing reference to FIG. 4 and renewed reference to FIG. 3, at the end of a remote interactive login session, a user using Java applet 21 may cause interactive command shell 117 to exit. In which event, remote interactive login server 116 closes the connection via data link 313 to remote interactive login client 311 and then exits. Remote interactive login client 311 exits and returns control to shell service interface 310. Shell service interface 310 erases credentials cache 112 and then exits. Pseudo-terminal interface 306 exits, and execution server 205 closes the connection via data link 104 to Java applet 21. Java applet 21 may be exited by a user of client 101.

Although the present invention has been particularly shown and described with respect to certain embodiments thereof, including without limitation a best mode if any, it should be readily apparent to those of skill in the art that various structural, logical, electrical, and other changes in form and detail may be made to these embodiments without departing from the scope of the present invention as set forth in the appended claims. Accordingly, the present invention is defined only by the appended claims that follow this detailed description.

What is claimed is:

1. A method for enhanced security for a remote login, comprising:

providing a client;

providing a gateway adapted for communication with the client;

providing an authentication server adapted for communication with the gateway;

providing authentication information from the client to the gateway;

obtaining from the authentication server client-authenticating information;

encoding the client-authenticating information;

providing the encoded client-authenticating information from the gateway to the client;

providing remote login information and the encoded client-authenticating information from the client to the gateway; and using the remote login information and the encoded client-authenticating information to provide downloadable executable content to the client.

2. The method of claim 1, further comprising:

providing an application on the client; and operating the application on the client using the downloadable executable content.

3. The method of claim 2, wherein the encoded client-authenticating information is a Hypertext Transport Protocol (HTTP) cookie, and wherein the application is web browser.

4. A method for enhanced security for a remote login, comprising:

providing a client workstation;

providing a web server in communication with the client workstation;

establishing enciphered communication between the client workstation and the web server;

providing login information from the client workstation to the web server;

invoking by the web server a service interface;

providing the login information to an initialization client using the service interface;

providing client-identifying information associated with the login information to the authentication server;

obtaining from the authentication server client-authenticating information in response to the client-identifying information provided;

encoding the client-authenticating information;

enciphering the encoded client-authenticating information;

providing the enciphered encoded client-authenticating information from the web server to the client workstation as a character data string;

providing remote login information and the character data string from the client to the gateway;

using the remote login information and the character data string to provide downloadable executable content to the client workstation; and operating an application on the client workstation using the downloadable executable content.

5. The method of claim 4, wherein the web server is a portion of a gateway, the gateway comprising at least one programmed computer having an operating system and web server software.

6. The method of claim 5, wherein the client workstation and the web server are operatively coupled via an insecure network.

7. The method of claim 6, wherein the initialization client and the authentication server are operatively coupled via an insecure network.

8. The method of claim 7, wherein the insecure network is a portion the Internet.

9. A method for enhanced security for an application using downloadable executable content in a computer network, the method comprising:

providing the computer network with a first and a second client, and a first and a second server;

operatively coupling the first client to the first server;

establishing enciphered communication between the first client and the first server using a first security protocol;

providing login information from the first client to the first server;

invoking a service interface with the first server;

providing the login information to the second client using the service interface;

operatively coupling the second client to the second server;

providing client-identifying information associated with the login information to the second server;

providing to the second client client-authenticating information from the second server in response to the client-identifying information provided;

encoding the client-authenticating information with the service interface;

enciphering the encoded client-authenticating information with the first server; and providing the enciphered encoded client-authenticating information from the first server to the first client as a character data string.

10. The method of claim 9, wherein the character data string is a value of a Hypertext Transport Protocol (HTTP) cookie.

11. The method of claim 10, wherein the client identification information comprises a portion of the login information.

12. The method of claim 10, wherein the first client comprises a first computer having a web browser, and the first server comprises a second computer having a web server.

13. The method of claim 12, wherein the first security protocol is a Secure Sockets Layer protocol, and wherein the second security protocol comprises at least a portion of a Kerberos protocol.

14. The method of claim 13, wherein the first client and the first server are operatively coupled via an insecure network, and the second server and the second client are operatively coupled via the insecure network.

15. The method of claim 14, wherein the insecure network is a portion of the Internet.

16. A method for enhanced security for an application using downloadable executable content in a computer network, comprising:

providing a client workstation, the client workstation comprising a programmed computer having a web browser;

providing a gateway, the gateway comprising another programmed computer having a web server;

operatively coupling the web browser to the web server using a World Wide Web network;

exchanging information between the web browser and the web server using a protocol stack;

establishing enciphered communication between the web browser and the web server using a security layer of the protocol stack;

providing login information from the web browser to the web server;

invoking by the web server a service interface;

providing the login information to a initialization client using the service interface;

operatively coupling the initialization client to an authentication server;

providing client-identifying information associated with the login information to the authentication server;

providing client-authenticating information to the initialization client in response to the client-identifying information provided to the authentication server;

encoding the client-authenticating information with the service interface;

enciphering the encoded client-authenticating information; and providing the enciphered encoded client-authenticating information from the web server to the web browser as a value of a Hypertext Transport Protocol (HTTP) cookie.

17. The method of claim 16, wherein the initialization client is a Kerberos initialization client.

18. The method of claim 17, wherein the login information comprises a Kerberos user principal name and a Kerberos user password, and the client-identifying information comprises a Kerberos user principal name.

19. The method of claim 16, wherein the service interface is a Common Gateway Interface service interface process.

20. The method of claim 16, wherein the client-authenticating information is American Standard Code for Information Interchange (ASCII) encoded.

21. The method of claim 16, wherein the client-authenticating information is Uniform Resource Locator (URL) encoded.

22. The method of claim 16, wherein the client-authenticating information is American Standard Code for Information Interchange (ASCII) and Uniform Resource Locator (URL) encoded.

23. The method of claim 16, further comprising the step of temporarily storing the client-authenticating information.

24. A method for enhanced security for an application using downloadable executable content in a computer network, comprising:

providing a client, the client comprising a computer having a web browser and a data character string temporarily stored in the client, the data character string comprising client-authenticating information from a prior login session;

providing a gateway, the gateway comprising another computer having a web server and comprising an archive of programs, the gateway and the client using a security protocol for enciphered communication;

providing remote login data and the client-authenticating information from the client to the gateway;

invoking by the gateway a service interface;

providing the remote login data and the client-authenticating information to the service interface;

providing from the service interface at least one determined parameter value associated with the remote login data and the client-authenticating information;

providing the at least one determined parameter value from the gateway to the client;

requesting by the client at least one program from the archive of programs;

providing to the client the at least one program requested from the archive; and operating a virtual machine on the client using the at least one parameter value and the at least one program.

25. The method of claim 24, wherein the remote login data comprises at least one remote host name and at least one remote user name.

26. The method of claim 24, wherein the remote login data comprises at least one pair of remote host and user names.

27. The method of claim 24, wherein the remote login data comprises a single remote user name and a plurality of remote host names.

28. A method for enhanced security for an application using downloadable executable content in a computer network, comprising:

providing a client, the client comprising a computer having a web browser and a data character string temporarily stored at the client, the data character string comprising client-authenticating information from a prior login session, the data character string representing a value of a Hypertext Transport Protocol cookie;

providing a gateway, the gateway comprising another computer having a web server operatively coupled to a Java classes archive, the web server and the browser using a security protocol for enciphered communication;

providing remote login data and the client-authenticating information from the web browser to the web server;

invoking a service interface by the web server;

providing the remote login data and the client-authenticating information to the service interface;

dynamically creating parameter values using the remote login data and the client-authenticating information provided to the service interface;

providing the parameter values from the service interface to the web browser;

providing a request from the web browser to the web server for a Java class download from the Java classes archive;

providing to the web browser at least one Java class requested from the Java classes archive; and operating a Java virtual machine on the client using the parameter values and the at least one Java class requested.

29. The method of claim 28, wherein the remote login data comprises at least one remote host name and at least one remote user name.

30. The method of claim 28, wherein the remote login data comprises at least one pair of remote host and user names.

31. The method of claim 28, wherein the remote login data comprises a single remote user name and a plurality of remote host names.

32. A method for enhanced security for an application using downloadable executable content in a computer network, comprising:

providing a client, the client comprising a computer having a web browser and a data character string temporarily stored at the client, the data character string comprising client-authenticating information from a prior login session, the data character string representing a value a Hypertext Transport Protocol cookie;

providing a gateway, the gateway comprising another computer having a web server operatively coupled to a Java classes archive, the web server and the browser using a security protocol for enciphered communication;

providing remote login data and the client-authenticating information from the web browser to the web server, the remote login data selected from at least one remote host name and at least one remote user name, at least one pair of remote host and user names, and a single remote user name and a plurality of remote host names;

invoking a Common Gateway Interface ("CGI") service by the web server;

providing the remote login data and the client-authenticating information to the CGI service;

using the CGI service to dynamically create parameter values from the remote login data and the client-authenticating information provided thereto;

providing the parameter values from the CGI service to the web server and then to the web browser;

providing a request from the web browser to the web server for at least one Java class;

providing from the web server to the web browser the at least one Java class requested from a Java classes archive; and operating a Java virtual machine on the client using the parameter values and the at least one Java class, the Java virtual machine comprising a Java applet.

33. The method of claim 32, wherein the parameter values provided from the CGI service are sent in a Hypertext Markup Language ("HTML") document, the HTML document comprising a reference to the at least one Java class.

34. A method for enhanced security for an application using downloadable executable content in a computer network, comprising:

providing a client, the client comprising a programmed computer having the downloadable executable content, the downloadable executable content comprising encoded client-authenticating information from a prior login session;

providing a gateway, the gateway comprising an execution server and a remote login client, the execution server and the downloadable executable content using a security protocol for enciphered communication over an insecure network;

invoking by the execution server a first interface;

providing remote login data and the encoded client-authenticating information from the downloadable executable content to the execution server and to the first interface;

providing a name from the execution server to the first interface;

invoking with the first interface a second interface associated with the name;

providing the encoded client-authenticating information and the remote login data from the first interface to the second interface;

decoding the encoded client-authenticating information to provide decoded client-authenticating information;

invoking with the second interface a remote login client;

providing the decoded client-authenticating information to the remote login client; and using the remote login client to obtain a previously created key and a previously created credential from the client-authenticating information.

35. The method of claim 34, further comprising:

using at least a portion of the client-authenticating information for authentication by an authentication server.

36. The method of claim 35, further comprising:

establishing enciphered communication with a remote host over the insecure network;

providing the remote login data from the remote login client to a remote login server of the remote login host; and using the remote login data provided to establish a bi-directional data path between the remote login host and the client through the gateway;

wherein the bi-directional data path comprises enciphered communication over the insecure network between the client and the gateway and between the gateway and the remote host.

37. A method for enhanced security for an application using downloadable executable content in a computer network, comprising:

providing a client, the client comprising a programmed computer having the downloadable executable content, the downloadable executable content comprising encoded client-authenticating information from a prior login session and comprising terminal emulation;

providing a gateway, the gateway comprising an execution server and a remote login client, the execution server and the downloadable executable content using a security protocol for enciphered communication over an insecure network;

executing by the execution server a pseudo-terminal interface;

providing remote login data and the encoded client-authenticating information from the downloadable executable content to the execution server and to the pseudo-terminal interface;

providing a shell service interface name from the execution server to the pseudo-terminal interface;

executing by the pseudo-terminal interface a shell service interface;

providing the encoded client-authenticating information and the remote login data from the pseudo-terminal interface to the shell service interface;

decoding the encoded client-authenticating information to provide decoded client-authenticating information;

temporarily storing the decoded client-authenticating information;

executing by the shell service interface a remote login client;

providing the client-authenticating information stored to the remote login client; and using the remote login client to obtain a previously created ticket granting ticket and session key from the client-authenticating information.

38. The method of claim 37, further comprising:

providing from the remote login client to an authentication server the ticket granting ticket and a first authenticator;

receiving from the authentication server to the remote login client a second authenticator;

providing from the remote interactive login client to the authentication server a server ticket request; and receiving from the authentication server to the remote login client a server ticket and a remote host session key.

39. The method of claim 38, further comprising:

providing a connection request from the remote login client to a network service, the network service being a portion of a remote host;

executing by the network service a remote login server;

providing from the remote login client to the remote login server the server ticket and a third authenticator;

receiving from the remote login server to the remote interactive login client a fourth authenticator;

providing the remote login data from the remote login client to the remote login server; and accessing an access control list database with the remote login server using the remote login data to check for authorization; and executing by the remote login server an interactive command shell.

40. A method for enhanced security for an application using downloadable executable content in a computer network, comprising:

providing a client, the client comprising a computer having a Java applet, the Java applet comprising encoded client-authenticating information from a prior login session and comprising terminal emulation;

providing a gateway, the gateway comprising an execution server and a remote interactive login client, the execution server and the Java applet using a security protocol for enciphered communication over an insecure network;

executing by the execution server a pseudo-terminal interface;

providing remote login data and the encoded client-authenticating information from the Java applet to the execution server;

providing a shell service interface name from the execution server to the pseudo-terminal interface;

executing by the pseudo-terminal interface a shell service interface;

providing the remote login data and the encoded client-authenticating information from the execution server and to the pseudo-terminal interface;

providing the encoded client-authenticating information and the remote login data from the pseudo-terminal interface to the shell service interface;

decoding the encoded client-authenticating information to provide decoded client-authenticating information;

temporarily storing the decoded client-authenticating information;

executing by the shell service interface a remote interactive login client;

providing the decoded client-authenticating information stored to the remote interactive login client; and using the remote interactive login client to obtain a previously created ticket granting ticket and key distribution center ("KDC") session key from the decoded client-authenticating information.

41. The method of claim 40, further comprising:

providing from the remote interactive login client to a KDC the ticket granting ticket and a first authenticator;

receiving from the KDC to the remote interactive login client a second authenticator;

providing from the remote interactive login client to the KDC a server ticket request; and receiving from the KDC to the remote interactive login client a server ticket and a remote host session key.

42. The method of claim 41, further comprising:

providing a connection request from the remote interactive login client to a network service, the network service being a portion of a remote host;

executing by the network service a remote interactive login server;

providing from remote interactive login client to remote interactive login server the server ticket and a third authenticator;

receiving from remote interactive login server to remote interactive login client a fourth authenticator;

providing the remote interactive login data from the remote interactive login client to the remote interactive login server; and accessing an access control list database by the remote interactive login server using the remote interactive login data to check for authorization; and executing by the remote interactive login server an interactive command shell.

43. A computer network for enhanced security for an application using downloadable executable content, comprising:

a client, the client comprising a first programmed computer, the first programmed computer having first authentication means for authenticating the client;

a gateway, the gateway comprising a second programmed computer, the second programmed computer comprising an execution server, a pseudo-terminal interface and a remote interactive login client, the gateway and the client having enciphering means for enciphered communication therebetween, the gateway having extracting means for obtaining at least a portion of the first authentication means;

a first data link means for operatively coupling the client to the gateway for electrical communication therebetween;

an authentication server, the authentication server comprising a third programmed computer, the authentication server second authentication means for authenticating the client using the at least a portion of the first authenticating means and to provide a remote login session credential;

a second data link means for operatively coupling the gateway to the authentication server for electrical communication therebetween;

a remote host, the remote host comprising a fourth programmed computer, the fourth programmed computer comprising a remote login server and an interactive command interface, the remote host having receiving means to receive the remote login session credential, having enciphering means for enciphered communication with the gateway and having authorization means to determine authorization status of the client; and a third data link means for operatively coupling the gateway to the remote host for electrical communication therebetween.

44. A computer network for enhanced security for an application using downloadable executable content, comprising:

a client, the client comprising a first programmed computer, the first programmed computer comprising downloadable executable content, the downloadable executable content configured with client-authenticating information;

a gateway, the gateway comprising a second programmed computer, the second programmed computer comprising an execution server, a pseudo-terminal interface and a remote interactive login client, the gateway and the client configured for enciphered communication therebetween, the gateway configured for extracting at least a portion of the client-authenticating information;

a first data link configured for operatively coupling the client to the gateway for electrical communication therebetween;

an authentication server, the authentication server comprising a third programmed computer, the authentication server configured to authenticate the client using the at least a portion of the client-authenticating information and to provide the remote login session credential in response to authentication of the client;

a second data link configured for operatively coupling the gateway to the authentication server for electrical communication therebetween;

a remote host, the remote host comprising a fourth programmed computer, the fourth programmed computer comprising a remote login server and an interactive command interface, the remote host configured to receive the remote login session credential for enciphered communication with the gateway and to determine authorization of the client; and a third data link configured for operatively coupling the gateway to the remote host for electrical communication therebetween.

45. The computer network of claim 44, further comprising at least one security protocol for enciphered communication over the first, the second and the third data link.

46. The computer network of claim 45, wherein the first, the second and the third data link comprise at least a portion of the Internet, and wherein the first computer comprises a web browser.

47. The computer network of claim 44, further comprising at least two security protocols for enciphered communication over the first, the second and the third data link, the first, the second and the third data link forming a portion of an insecure network.

48. The computer network of claim 47, wherein the downloadable executable content comprises a Java applet.

49. The computer network of claim 47, wherein the second computer comprises a shell service interface for communication with the remote interactive login client.

50. The computer network of claim 49, wherein the second computer comprises a certificate database to support enciphered communication with the client.

51. The computer network of claim 50, wherein the second computer comprises volatile memory for temporary storing the client-authenticating information.

52. The computer network of claim 47, wherein the third computer comprises a key distribution center and Kerberos database for the authentication.

53. The computer network of claim 47, wherein the fourth computer comprises a network service configured for communication with the remote interactive login client.

54. The computer network of claim 53, wherein the fourth computer comprises an access control list database and a key database.

55. The computer network of claim 54, wherein the interactive command interface is an interactive command shell.

* * * * *